(12) United States Patent
Toyoshima et al.

(10) Patent No.: US 12,540,668 B2
(45) Date of Patent: Feb. 3, 2026

(54) POWER TRANSMISSION DEVICE

(71) Applicants: JATCO Ltd, Fuji (JP); NISSAN MOTOR CO., LTD., Yokohama (JP)

(72) Inventors: Tahei Toyoshima, Isehara (JP); Hyunhwan Lee, Bucheon-shi (KR); Tomoya Otaki, Isehara (JP); Masahiro Kouya, Hiratsuka (JP)

(73) Assignees: JATCO Ltd, Fuji (JP); NISSAN MOTOR CO., LTD., Fuji (JP)

( * ) Notice: Subject to any disclaimer, the term of this patent is extended or adjusted under 35 U.S.C. 154(b) by 0 days.

(21) Appl. No.: 18/847,852

(22) PCT Filed: Oct. 24, 2022

(86) PCT No.: PCT/JP2022/039490
§ 371 (c)(1),
(2) Date: Sep. 17, 2024

(87) PCT Pub. No.: WO2023/181470
PCT Pub. Date: Sep. 28, 2023

(65) Prior Publication Data
US 2025/0207662 A1    Jun. 26, 2025

(30) Foreign Application Priority Data
Mar. 23, 2022    (JP) .................... 2022-046338

(51) Int. Cl.
*F16H 57/04* (2010.01)
*F16H 57/05* (2006.01)

(52) U.S. Cl.
CPC ..... *F16H 57/0453* (2013.01); *F16H 57/0404* (2013.01); *F16H 57/0423* (2013.01); *F16H 57/0436* (2013.01); *F16H 57/05* (2013.01)

(58) Field of Classification Search
CPC ............. F16H 57/0423; F16H 57/0404; F16H 57/0453; F16H 57/0436; F16H 57/05; F16H 57/0489; F16H 57/04
(Continued)

(56) References Cited

U.S. PATENT DOCUMENTS

| | | | | |
|---|---|---|---|---|
| 1,151,271 A | * | 8/1915 | Johansson | F16H 57/0434 184/6.12 |
| 1,220,810 A | * | 3/1917 | Alquist | F16H 57/0447 184/6.12 |

(Continued)

FOREIGN PATENT DOCUMENTS

JP    2012-102818 A    5/2012

*Primary Examiner* — Henry Y Liu
(74) *Attorney, Agent, or Firm* — Foley & Lardner LLP

(57) ABSTRACT

A space in a case in which oil is stored is partitioned by a baffle plate into a first space in which a driven sprocket provided on an input shaft of an oil pump is disposed and a second space in which an oil strainer in communication with the oil pump is disposed. At least a part of the driven sprocket is immersed in the oil in the first space. The baffle plate includes a base portion and a cover portion coupled to the base portion to cover the driven sprocket. The base portion and the cover portion are engaged with each other by an engagement piece that extends from one of the base portion and the cover portion and is engaged with an outer surface on the other of the base portion and the cover portion, and are coupled with each other by a bolt at a position different from an engagement position of the engagement piece.

3 Claims, 5 Drawing Sheets

(58) Field of Classification Search
USPC .................................................. 184/6.12
See application file for complete search history.

(56) References Cited

U.S. PATENT DOCUMENTS

| | | | | |
|---|---|---|---|---|
| 1,220,811 A * | 3/1917 | Alquist | ............... | F16H 57/0447 384/129 |
| 1,554,081 A * | 9/1925 | Berton | ............... | F16N 7/40 418/8 |
| 1,813,819 A * | 7/1931 | Ross | ............... | F16H 55/14 74/609 |
| 2,292,086 A * | 8/1942 | Pritchard | ............... | F16H 57/0423 184/11.1 |
| 2,645,305 A * | 7/1953 | Roos | ............... | F16H 57/0427 184/11.1 |
| 3,529,698 A * | 9/1970 | Nelson | ............... | F16H 57/0447 184/6.12 |
| 3,601,515 A * | 8/1971 | Pelizzoni | ............... | F16H 57/0493 184/6.12 |
| 3,625,310 A * | 12/1971 | Herrick | ............... | F16N 19/003 184/6.12 |
| 4,414,861 A * | 11/1983 | Witt | ............... | F16H 57/0427 184/6.12 |
| 4,693,133 A * | 9/1987 | Tomita | ............... | F16H 57/0006 184/6.12 |
| 4,914,968 A * | 4/1990 | Diermeier | ............... | F16N 39/06 184/6.24 |
| 5,048,370 A * | 9/1991 | Duello | ............... | F16H 57/0423 74/606 R |
| 5,505,112 A * | 4/1996 | Gee | ............... | F16H 57/0447 184/6.12 |
| 5,768,954 A * | 6/1998 | Grabherr | ............... | F16H 57/0447 74/606 R |
| 6,238,312 B1 * | 5/2001 | Tsubata | ............... | F16H 57/0489 474/146 |
| 6,299,561 B1 * | 10/2001 | Kramer | ............... | F16H 57/0447 184/6.12 |
| 6,616,432 B2 * | 9/2003 | Szczepanski | ............... | F04C 2/082 184/6.12 |
| 7,686,137 B2 * | 3/2010 | Tominaga | ............... | F16H 57/0408 184/6.12 |
| 7,984,791 B2 * | 7/2011 | Taguchi | ............... | F16H 57/0483 184/6.12 |
| 8,371,978 B2 * | 2/2013 | Nobata | ............... | F16H 57/0457 475/160 |
| 8,739,930 B2 * | 6/2014 | Bonning | ............... | F16H 57/0436 184/6.12 |
| 8,875,841 B2 * | 11/2014 | Yoshimi | ............... | F16H 57/0409 184/6.12 |
| 8,919,500 B1 * | 12/2014 | Kilcrease | ............... | F16H 57/0423 184/6.12 |
| 9,010,492 B2 * | 4/2015 | Suzuta | ............... | F16H 57/043 184/6.12 |
| 9,046,166 B2 * | 6/2015 | Neumeister | ............... | F16H 57/045 |
| 9,631,715 B1 * | 4/2017 | Steward | ............... | F16H 7/18 |
| 9,772,027 B2 * | 9/2017 | Preston | ............... | F16H 57/0409 |
| 9,874,211 B2 * | 1/2018 | Ike | ............... | F16H 61/0025 |
| 10,208,848 B2 * | 2/2019 | Hotait | ............... | F16H 57/0463 |
| 10,309,519 B2 * | 6/2019 | Zhang | ............... | F16H 57/05 |
| 10,774,921 B2 * | 9/2020 | Ijichi | ............... | F16H 57/0489 |
| 10,837,541 B2 * | 11/2020 | Itou | ............... | F16H 57/0457 |
| 11,725,721 B2 * | 8/2023 | Torii | ............... | B60K 6/383 184/6.12 |
| 11,940,043 B2 * | 3/2024 | Itou | ............... | F16H 55/30 |
| RE50,323 E * | 3/2025 | Itou | ............... | F16H 7/06 |
| 2006/0048600 A1 * | 3/2006 | Taguchi | ............... | F16H 57/0483 74/607 |
| 2006/0060424 A1 * | 3/2006 | Tominaga | ............... | F16H 57/0423 184/11.1 |
| 2006/0065486 A1 * | 3/2006 | Matsubara | ............... | F16H 61/00 184/6.12 |
| 2006/0065487 A1 * | 3/2006 | Tominaga | ............... | F16H 57/05 184/6.12 |
| 2012/0247875 A1 * | 10/2012 | Suzuta | ............... | F16H 57/043 464/7 |
| 2015/0337947 A1 * | 11/2015 | Steward | ............... | F15D 1/0005 184/6.12 |
| 2016/0003245 A1 * | 1/2016 | Ike | ............... | F04C 2/10 417/362 |
| 2019/0085971 A1 * | 3/2019 | Itou | ............... | F16H 7/06 |
| 2021/0190200 A1 * | 6/2021 | Itou | ............... | F16H 55/17 |

* cited by examiner

SCHEMATIC CROSS-SECTION TAKEN ALONG LINE III-III

POWER TRANSMISSION DEVICE

TECHNICAL FIELD

The present invention relates to a power transmission device.

BACKGROUND ART

Patent Document 1 discloses a configuration in which a driven sprocket of an oil pump driven by a chain is immersed in oil stored in a case to lubricate a drive sprocket, the driven sprocket, and the chain.

Further, in this configuration, a space in which the oil is stored is divided into a space in which the driven sprocket is disposed and a space in which an oil strainer is disposed by a baffle plate, and air in the oil increased by the driven sprocket and the chain stirring the oil is prevented from being sucked by the oil pump via the oil strainer.

PRIOR ART DOCUMENT

Patent Document

Patent Document 1: JP 2012-102818 A

SUMMARY OF INVENTION

In Patent Document 1, the baffle plate includes a baffle plate body component and a baffle plate cover component attached to the baffle plate body component, and the baffle plate body component and the baffle plate cover component are coupled to each other by bolting two locations.

In order to bolt two locations, it is necessary to secure a space for bolting two locations, specifically, a space in which a head of a bolt or a tool is accommodated, at two locations around the baffle plate. However, it may be difficult to secure the space with other components disposed around the baffle plate.

The present invention has been made in view of such a technical problem, and an object of the present invention is to set the number of bolts required for coupling components constituting a baffle plate to be one.

According to an aspect of the present invention, there is provided a power transmission device in which a space in a case in which oil is stored is partitioned by a baffle plate into a first space in which a driven sprocket provided on an input shaft of an oil pump is disposed and a second space in which an oil strainer in communication with the oil pump is disposed, and at least a part of the driven sprocket is immersed in the oil in the first space, in which the baffle plate includes a base portion and a cover portion coupled to the base portion to cover the driven sprocket, and the base portion and the cover portion are engaged with each other by an engagement piece that extends from one of the base portion and the cover portion and is engaged with an outer surface on the other of the base portion and the cover portion, and are coupled with each other by a bolt at a position different from an engagement position of the engagement piece.

According to the above aspect, the number of bolts required for coupling a base portion and a cover portion constituting a baffle plate can be set to be one. Accordingly, it is not necessary to secure a plurality of spaces for bolting with other components disposed around the baffle plate, and even when it is difficult to secure such spaces with other components disposed around the baffle plate, the base portion and the cover portion can be coupled.

DESCRIPTION OF EMBODIMENTS

Hereinafter, a vehicle 100 including a power transmission device 10 according to an embodiment of the present invention will be described with reference to the accompanying drawings.

Figure 1:
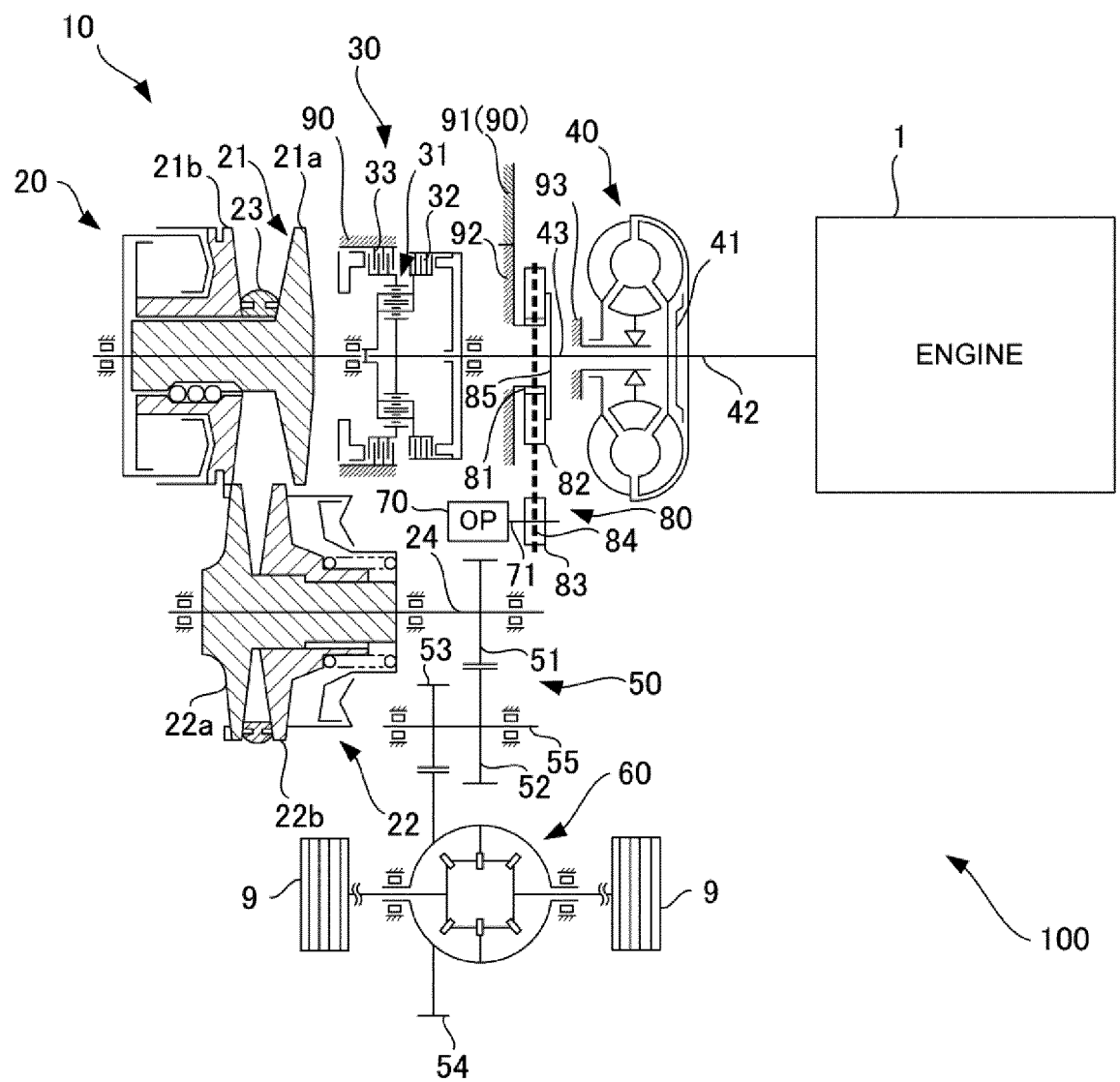
FIG. 1 is a schematic diagram for illustrating a schematic configuration of a vehicle including a power transmission device according to an embodiment of the present invention.

FIG. 1 is a schematic diagram for illustrating a schematic configuration of the vehicle 100. As illustrated in FIG. 1, the vehicle 100 includes an engine 1, and the power transmission device 10 provided in a power transmission path connecting the engine 1 and driving wheels 9.

The power transmission device 10 is a belt continuously variable transmission including a variator 20, a forward/reverse switching mechanism 30, a torque converter 40, a gear power transmission mechanism 50, a differential gear device 60, an oil pump (OP) 70, a chain power transmission mechanism 80, a case 90, and a case cover 93 attached to an opening of the case 90.

In the vehicle 100, rotation generated in the engine 1 is transmitted to the driving wheels 9 via the torque converter 40, the forward/reverse switching mechanism 30, the variator 20 serving as a transmission mechanism, the gear power transmission mechanism 50, and the differential gear device 60.

The torque converter 40 includes a lock-up clutch 41, and when the lock-up clutch 41 is engaged, an input shaft 42 and an output shaft 43 of the torque converter 40 are directly connected, and the input shaft 42 and the output shaft 43 rotate at the same speed.

The variator 20 includes a primary pulley 21 and a secondary pulley 22 that are arranged such that V-shaped grooves are aligned, and a belt 23 that is wound around the V-shaped grooves of the pulleys 21 and 22.

The engine 1 is disposed coaxially with the primary pulley 21, and the torque converter 40 and the forward/reverse switching mechanism 30 are provided between the engine 1 and the primary pulley 21 in this order from an engine 1 side.

The forward/reverse switching mechanism 30 includes a double pinion planetary gear set 31 as a main component, a sun gear of the double pinion planetary gear set is coupled to the output shaft 43 of the torque converter 40, and a carrier of the double pinion planetary gear set is coupled to the primary pulley 21 of the variator 20. The forward/reverse switching mechanism 30 further includes a forward clutch 32 that directly connects the sun gear and the carrier of the double pinion planetary gear set 31, and a reverse brake 33 that fixes a ring gear. When the forward clutch 32 is engaged, input rotation from the output shaft 43 is transmitted to the primary pulley 21 without changing a rotation direction, and when the reverse brake 33 is engaged, the input rotation from the output shaft 43 is reversed and is transmitted to the primary pulley 21.

The forward clutch 32 is engaged by being supplied with a clutch pressure from a hydraulic control valve unit (not illustrated) when a forward traveling mode is selected as a traveling mode of the vehicle 100. The reverse brake 33 is engaged by being supplied with a brake pressure from the hydraulic control valve unit when a reverse traveling mode is selected as the traveling mode of the vehicle 100.

Rotation of the primary pulley 21 is transmitted to the secondary pulley 22 via the belt 23, and rotation of the secondary pulley 22 is transmitted to the driving wheels 9 via an output shaft 24, the gear power transmission mechanism 50, and the differential gear device 60.

In order to make it possible to change a speed ratio between the primary pulley 21 and the secondary pulley 22 during the above-mentioned power transmission, among conical plates forming the V-shaped grooves of the primary pulley 21 and the secondary pulley 22, one type of the conical plate is referred to as fixed conical plates 21a and 22a, and the other type of the conical plate is referred to as movable conical plates 21b and 22b that can be displaced in an axial direction.

The primary pulley 21 and the secondary pulley 22 operate in accordance with a hydraulic pressure of oil supplied from a control valve unit 95 to an oil chamber of the primary pulley 21 and an oil chamber of the secondary pulley 22.

Specifically, when a primary pulley pressure and a secondary pulley pressure are applied to the oil chambers of the primary pulley 21 and the secondary pulley 22, respectively, the movable conical plates 21b and 22b are biased toward the fixed conical plates 21a and 22a, and power is transmitted between the primary pulley 21 and the secondary pulley 22 by frictional engagement between the belt 23 and the conical plates.

At the time of gear shift, a width of the V-shaped grooves of both the pulleys 21 and 22 is changed by a differential pressure between the primary pulley pressure and the secondary pulley pressure generated corresponding to a target speed ratio, and an arc diameter of the belt 23 wound around the pulleys 21 and 22 is continuously changed, thereby realizing the target speed ratio.

The gear power transmission mechanism 50 includes a first gear 51 provided on the output shaft 24 of the variator 20, a second gear 52 and a third gear 53 provided on an intermediate shaft 55, and a fourth gear 54 fixed to the differential gear device 60.

Figure 2:
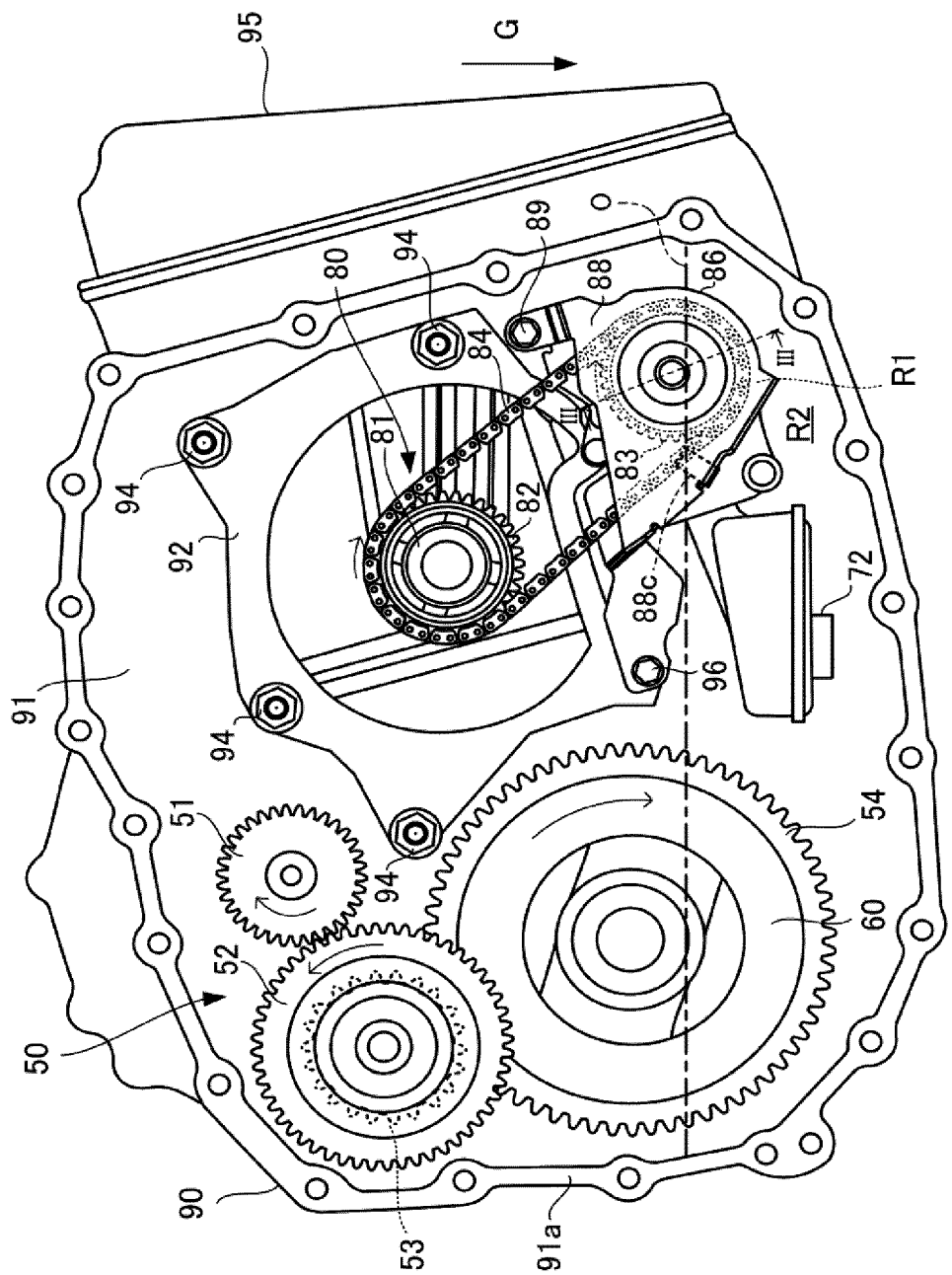
FIG. 2 is a view of the inside of the power transmission device as viewed from a case cover side.

The case 90 includes an intermediate wall 91 and an intermediate cover 92 attached to an opening of the intermediate wall 91 (FIG. 2). The intermediate wall 91 is a wall perpendicular to an axial direction of the output shaft 43 and the like, and partitions the inside of the case 90 into a space in which the pulleys 21 and 22 and the forward/reverse switching mechanism 30 are accommodated and a space in which the gear power transmission mechanism 50 and the chain power transmission mechanism 80 are accommodated. Oil is stored in a bottom portion of the case 90. That is, the case 90 forms an oil bath in which oil is stored.

The intermediate cover 92 is provided between the torque converter 40 and the forward/reverse switching mechanism 30 to cover a torque converter 40 side of the forward/reverse switching mechanism 30.

The chain power transmission mechanism 80 includes a drive sprocket 82 rotatably supported by the intermediate cover 92 via a bush 81, a driven sprocket 83 provided on an input shaft 71 of an oil pump 70, and a chain 84 coupling the drive sprocket 82 and the driven sprocket 83.

The drive sprocket 82 is connected to the output shaft 43 of the torque converter 40 via a connecting member 85. As a result, when the output shaft 43 of the torque converter 40 rotates, the oil pump 70 is driven to supply oil to the control valve unit 95.

The case cover 93 is fixed to the case 90 to cover the gear power transmission mechanism 50 and the chain power transmission mechanism 80.

Next, an internal configuration of the power transmission device 10 will be described in detail with reference to FIGS. 2 to 5.

FIG. 2 is a view of the inside of the power transmission device 10 as viewed from a case cover 93 side. A left-right direction in FIG. 2 corresponds to a front-rear direction of the vehicle 100 (the right direction is the front direction), and a direction perpendicular to a paper surface corresponds to a left-right direction of the vehicle 100 (the depth direction of the page surface is the left direction). A solid arrow G indicates a direction of gravity, and a one-dot chain line indicates a height of an oil surface O of the oil stored in the case 90.

As illustrated in FIG. 2, the gear power transmission mechanism 50 and the differential gear device 60 are supported by the case 90 on a rear side (a left side in FIG. 2) of the vehicle 100 in the power transmission device 10.

The chain power transmission mechanism 80 is supported by the case 90 on a front side of the vehicle 100 in the power transmission device 10.

The forward/reverse switching mechanism 30 and the primary pulley 21 are located on a left side (the depth of the page surface) of the vehicle 100 with respect to the drive sprocket 82 of the chain power transmission mechanism 80, and are not illustrated in FIG. 2.

The intermediate cover 92 is fixed to the intermediate wall 91 by a plurality of bolts 94.

The drive sprocket 82 is rotatably supported by the intermediate cover 92 via the bush 81. The driven sprocket 83 is disposed below the drive sprocket 82. The drive sprocket 82 and the driven sprocket 83 are connected by the chain 84.

The driven sprocket 83 is substantially entirely covered with a bag-shaped baffle plate 86 whose upper side in a vertical direction is open. A space in the case 90 in which the oil is stored is partitioned by the baffle plate 86 into a first space R1 in which the driven sprocket 83 is disposed and a second space R2 in which an oil strainer 72 in communication with the oil pump 70 to be described later is disposed.

A lower portion of the driven sprocket 83 in the vertical direction is immersed in the oil in the first space R1, whereby the chain power transmission mechanism 80 is lubricated.

Since the first space R1 is separated from the second space R2 by the baffle plate 86, air in the oil increased by the driven sprocket 83 and the chain 84 stirring the oil in the first space R1 is prevented from flowing into the second space R2, and the oil pump 70 is prevented from sucking air via the oil strainer 72 disposed in the second space R2.

Figure 3:
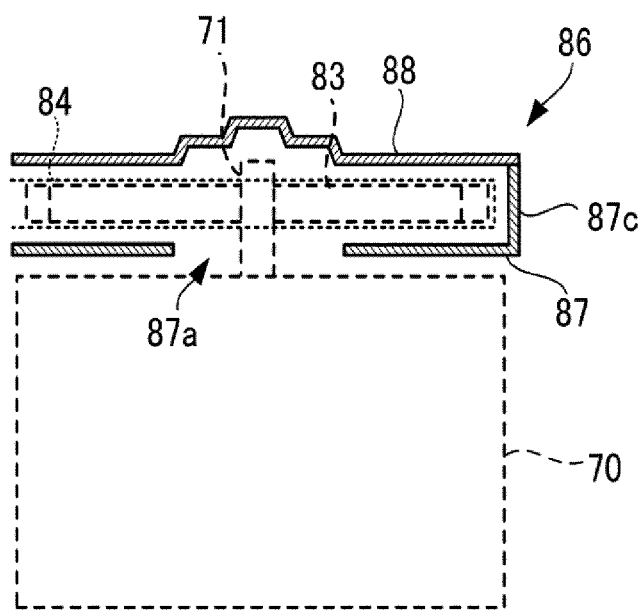
FIG. 3 is a schematic cross-sectional view taken along a line III-III in FIG. 2.

FIG. 3 is a schematic cross-sectional view taken along a line III-III in FIG. 2, and illustrates a configuration other than the baffle plate 86 by a broken line. As illustrated in FIG. 3, the baffle plate 86 includes a base portion 87 and a cover portion 88 coupled to the base portion 87 to cover the driven sprocket 83.

The driven sprocket 83 is provided on the input shaft 71 of the oil pump 70 via an opening 87a of the base portion 87.

When the rotation of the drive sprocket 82 is transmitted to the driven sprocket 83 via the chain 84 and the driven sprocket 83 rotates, the oil pump 70 is driven.

Figure 4:
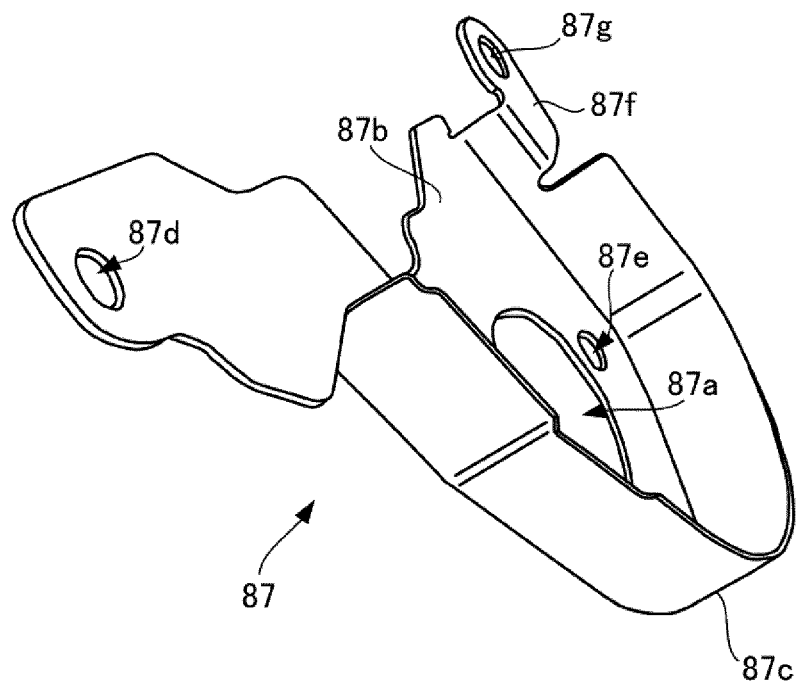
FIG. 4 is a perspective view of a base portion.

FIG. 4 illustrates the base portion 87.

The base portion 87 is made of metal by press working. The base portion 87 includes a base plate 87*b* and a chain cover portion 87*c*.

The base plate 87*b* is disposed parallel to a side surface of the driven sprocket 83 (a surface perpendicular to a rotation axis of the driven sprocket 83), and has the opening 87*a* through which the input shaft 71 of the oil pump 70 passes at the center.

The chain cover portion 87*c* includes a substantially arc-shaped chain cover portion 87*c* that extends perpendicularly to the base plate 87*b* from an outer edge of the base plate 87*b* and covers an entire meshing portion between the driven sprocket 83 and the chain 84. The chain cover portion 87*c* may be provided on the cover portion 88 instead of the base portion 87.

The base plate 87*b* includes bolt holes 87*d* and 87*e* through which a bolt 96 (see FIG. 2) for fixing the base portion 87 to the case 90 is inserted.

The chain cover portion 87*c* includes a tab 87*f* that extends outward in parallel to the base plate 87*b*. The tab 87*f* includes a bolt hole 87*g* through which a bolt 89 (see FIG. 2) is inserted. The bolt 89 fastens the base portion 87 and the cover portion 88 to the case 90 together, thereby coupling the base portion 87 and the cover portion 88 to each other and fixing the base portion 87 and the cover portion 88 to the case 90.

Figure 5:
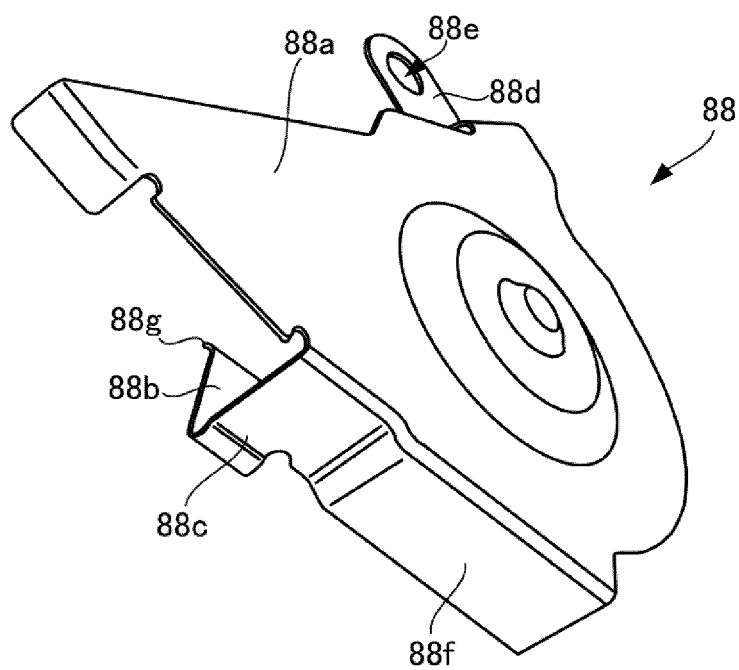
FIG. 5 is a perspective view of a cover portion.

FIG. 5 illustrates the cover portion 88.

The cover portion 88 is made of metal by press working. The cover portion 88 includes a cover plate 88*a* and a clip 88*c* as an engagement piece.

The cover plate 88*a* is disposed parallel to a side surface of the driven sprocket 83 and a base plate 97*b* of the base portion 87.

The clip 88*c* has a substantially L-shaped cross section in which the clip 88*c* extends perpendicularly to the cover plate 88*a* from an outer edge of the cover plate 88*a* and is bent so that an interior angle is less than 90 degrees. The clip 88*c* includes a contact portion 88*b* that is pressed against an outer surface of the base portion 87 (a surface of the base portion 87 or the base plate 87*b* facing the case 90) when the cover portion 88 is attached to the base portion 87.

A distance between a contact portion 83*b* and the cover plate 88*a* is substantially equal to a width of the chain cover portion 87*c* at the outer edge of the cover plate 88*a*. The distance is smaller than the width of the chain cover portion 87*c* from the outer edge of the cover plate 88*a* to an inner side of the cover portion 88, except for a distal end portion 88*g* bent in a direction away from the cover plate 88*a*. Accordingly, when the clip 88*c* is engaged with the outer surface of the base portion 87, the clip 88*c* is elastically deformed, and a spring force that presses the base portion 87 and the cover portion 88 against each other is generated by the clip 88*c*.

In addition, the cover portion 88 includes a tab 88*d* that extends outward in parallel to the cover plate 88*a* at the outer edge of the cover plate 88*a*. The tab 88*d* includes a bolt hole 88*e* through which the bolt 89 (see FIG. 2) is inserted. The bolt 89 fastens the base portion 87 and the cover portion 88 to the case 90 together, thereby coupling the base portion 87 and the cover portion 88 to each other and fixing the base portion 87 and the cover portion 88 to the case 90. The tab 88*d* and the bolt hole 88*e* are provided at a position different from the clip 88*c*, more specifically, at the outer edge of the cover plate 88*a* on an opposite side of the clip 88*c* across substantially a center of the cover plate 88*a*.

The cover portion 88 includes a support portion 88*f* that extends perpendicularly to the cover plate 88*a* from the outer edge of the cover plate 88*a* and comes into surface contact with the chain cover portion 87*c* when the base portion 87 and the cover portion 88 are coupled.

When the base portion 87 and the cover portion 88 are configured as described above and the baffle plate 86 is attached to the case 90, the base portion 87, the driven sprocket 83, the chain 84, and the cover portion 88 are attached to the case 90 in this order.

Next, a procedure for attaching the cover portion 88 to the base portion 87 will be described.

When the cover portion 88 is attached to the base portion 87, first, the clip 88*c* is engaged with the outer surface of the base portion 87. In a portion of the base portion 87 to be engaged with the clip 88*c*, a gap sufficient to insert the contact portion 83*b* of the clip 88*c* is formed between the base portion 87 and the case 90, and the clip 88*c* and the case 90 do not interfere with each other. Since the clip 88*c* is engaged with the base portion 87 from an outside of the base portion 87, the clip 88*c* does not interfere with the driven sprocket 83 and the chain 84 that are disposed inside the base portion 87.

At this time, the support portion 88*f* comes into surface contact with the chain cover portion 87*c*, so that the cover portion 88 can be roughly positioned with respect to the base portion 87. Further, as compared with a case where only the clip 88*c* is engaged with the outer surface of the base portion 87, a posture of the cover portion 88 can be stabilized.

When the clip 88*c* is engaged with the outer surface of the base portion 87, the base portion 87 and the cover portion 88 are pressed and engaged with each other by the spring force of the clip 88*c*.

Next, the cover portion 88 is slid in a plane direction to align the bolt hole 88*e* with the bolt hole 87*g* of the base portion 87 and a bolt hole (not illustrated) of the case 90. The base portion 87 and the cover portion 88 are fastened together to the case 90 by the bolt 89 (see FIG. 2), so that the base portion 87 and the cover portion 88 are coupled to each other and fixed to the case 90.

Since the base portion 87 and the cover portion 88 are pressed against each other by the spring force of the clip 88*c*, a gap between the base portion 87 and the cover portion 88, specifically, a gap between an end of the chain cover portion 87*c* and the outer edge of the cover plate 88*a* is reduced, so that appropriate sealing between the base portion 87 and the cover portion 88 can be secured. Accordingly, air in oil increased by the driven sprocket 83 and the chain 84 stirring the oil stored in the case 90 is prevented from flowing out to the second space R2 in which the strainer 72 is disposed, and the oil pump 70 is prevented from sucking the air via the oil strainer 72.

The base portion 87 and the cover portion 88 are directly pressed against each other, and a pressing force is appropriately adjusted by elastic deformation of the clip 88*c*. Therefore, even if the base portion 87 or the cover portion 88 temporarily has a dimensional error, the clip 88*c* is elastically deformed to absorb the dimensional error, so that plastic deformation of the base portion 87 and the cover portion 88 can be prevented without applying an excessive force to the base portion 87 and the cover portion 88 as in the case of tightening a plurality of portions with bolts.

As described above, since the sealing between the base portion 87 and the cover portion 88 can be secured only by the base portion 87 and the cover portion 88, it is not necessary to sandwich a rubber component for sealing between the base portion 87 and the cover portion 88. However, a sealing rubber member may be sandwiched between the base portion 87 and the cover portion 88 to further enhance the sealing.

Returning to FIG. 2, the oil strainer 72 for sucking up the oil stored in the case 90 is disposed at a bottom of the case 90 and between the gear power transmission mechanism 50 and the chain power transmission mechanism 80. The oil strainer 72 communicates with the oil pump 70, and the oil sucked up from the oil strainer 72 is supplied from the oil pump 70 and further from the oil pump 70 to the control valve unit 95.

The control valve unit 95 is attached to a front side (a right side in FIG. 2) of the vehicle 100 in the case 90. Oil is supplied from the oil pump 70 to the control valve unit 95. The control valve unit 95 includes a solenoid valve, a spool valve, and the like, and controls a hydraulic pressure supplied to the oil chamber of the primary pulley 21, the oil chamber of the secondary pulley 22, the forward/reverse switching mechanism 30, the lock-up clutch 41, and the like.

The fourth gear 54 of the gear power transmission mechanism 50 is fixed to the differential gear device 60. The first gear 51, the second gear 52, and the third gear 53 are disposed above the differential gear device 60. The secondary pulley 22 is located on the left side (the depth of the page surface) of the vehicle 100 with respect to the first gear 51, and is not illustrated in FIG. 2. The fourth gear 54 is disposed such that a part thereof is immersed in the oil stored in the case 90.

Next, main functions and effects of the power transmission device 10 implemented as described above will be described collectively.

(1) In the power transmission device 10 according to the present embodiment, a space in the case 90 in which oil is stored is partitioned by the baffle plate 86 into the first space R1 in which the driven sprocket 83 provided on the input shaft 71 of the oil pump 70 is disposed and the second space R2 in which the oil strainer 72 in communication with the oil pump 70 is disposed, and at least a part of the driven sprocket 83 is immersed in the oil in the first space R1.

The baffle plate 86 includes the base portion 87 and the cover portion 88 coupled to the base portion 87 to cover the driven sprocket 83.

The base portion 87 and the cover portion 88 are engaged with each other by the clip 88c serving as an engagement piece that extends from one of the base portion 87 and the cover portion 88 and is engaged with an outer surface on the other of the base portion 87 and the cover portion 88, and are coupled to each other by the bolt 89 at a position different from an engagement position of the clip 88c.

Accordingly, since the number of bolts required for coupling the base portion 87 and the cover portion 88 is one, even when it is difficult to secure a space for bolting with other components disposed around the baffle plate 86, the base portion 87 and the cover portion 88 can be coupled to each other.

(2) Further, since the clip 88c has a spring force, the base portion 87 and the cover portion 88 are pressed against each other by the spring force, and the sealing between the base portion 87 and the cover portion 88 is secured.

Accordingly, a seal component for ensuring the sealing between the base portion 87 and the cover portion 88 is not required, and the number of assembling steps and cost of the baffle plate 86 can be reduced.

The base portion 87 and the cover portion 88 are brought into direct contact with each other while the base portion 87 and the cover portion 88 are coupled to each other, and the pressing force between the base portion 87 and the cover portion 88 is appropriately adjusted by elastic deformation of the clip 88c. Therefore, it is possible to prevent plastic deformation of the components due to an excessive force acting on the base portion 87 and the cover portion 88.

(3) The base portion 87 is disposed between the case 90 and the driven sprocket 83, and the clip 88c is provided on the cover portion 88.

When the clip 88c is provided on the cover portion 88, the clip 88c is locked from an outer side of the base portion 87, so that the clip 88c does not interfere with the driven sprocket 83 and the chain 84 that are disposed inside the base portion 87, and the workability of the work of coupling the base portion 87 and the cover portion 88 is improved.

The clip 88c may be provided on the base portion 87. In this case, the clip 88c extends from the base portion 87 and engages with an outer surface of the cover portion 88 (a surface of the cover portion 88 or the cover plate 88a opposite to the case 90). In a case where a gap sufficient to insert the clip 88c between the base portion 87 and the case 90 cannot be secured, the clip 88c is preferably provided on the base portion 87.

Although the embodiment of the present invention has been described above, the above embodiment is merely an application example of the present invention and is not intended to limit the technical scope of the present invention to the specific configuration of the above embodiment.

For example, in the above embodiment, a case where the power transmission device 10 is a belt continuously variable transmission has been described. However, the power transmission device 10 may be a speed reduction device having a fixed speed ratio, a stepped transmission device using planetary gears, or the like.

The present application claims a priority of Japanese Patent Application No. 2022-046338 filed with the Japan Patent Office on Mar. 23, 2022, all the contents of which are hereby incorporated by reference.

DESCRIPTION OF REFERENCE SIGNS

10 power transmission device
70 oil pump
71 input shaft
80 chain power transmission mechanism
83 driven sprocket
86 baffle plate
87 base portion
88 cover portion
88c clip (engagement piece)
90 case

The invention claimed is:

1. A power transmission device in which a space in a case in which oil is stored is partitioned by a baffle plate into a first space in which a driven sprocket provided on an input shaft of an oil pump is disposed and a second space in which an oil strainer in communication with the oil pump is disposed, and at least a part of the driven sprocket is immersed in the oil in the first space, wherein
the baffle plate includes a base portion and a cover portion coupled to the base portion to cover the driven sprocket, and
the base portion and the cover portion are engaged with each other by an engagement piece that extends from one of the base portion and the cover portion and is engaged with an outer surface on the other of the base portion and the cover portion, and are coupled with each other by a bolt at a position different from an engagement position of the engagement piece.

2. The power transmission device according to claim 1, wherein the engagement piece is a clip having a spring force, and presses the base portion and the cover portion against each other by the spring force.

3. The power transmission device according to claim 1, wherein the base portion is disposed between the case and the driven sprocket, and the engagement piece is provided on the cover portion.

* * * * *